US010062392B2

(12) United States Patent
Belhomme et al.

(10) Patent No.: US 10,062,392 B2
(45) Date of Patent: Aug. 28, 2018

(54) METHOD AND DEVICE FOR ESTIMATING A DEREVERBERATED SIGNAL

(71) Applicant: INVOXIA, Issy les Moulineaux (FR)

(72) Inventors: Arthur Belhomme, Paris (FR); Roland Badeau, Paris (FR); Yves Grenier, Magny les Hameaux (FR); Eric Humbert, Boulogne Billancourt (FR)

(73) Assignee: INVOXIA, Issy les Moulineaux (FR)

( * ) Notice: Subject to any disclaimer, the term of this patent is extended or adjusted under 35 U.S.C. 154(b) by 0 days.

(21) Appl. No.: 15/604,997

(22) Filed: May 25, 2017

(65) Prior Publication Data

US 2017/0345441 A1 Nov. 30, 2017

(30) Foreign Application Priority Data

May 25, 2016 (FR) ..................................... 16 54713
Feb. 9, 2017 (FR) ..................................... 17 51073

(51) Int. Cl.
*H04B 3/20* (2006.01)
*G10L 21/0264* (2013.01)
(Continued)

(52) U.S. Cl.
CPC ...... *G10L 21/0264* (2013.01); *G10L 21/0232* (2013.01); *H04R 3/04* (2013.01);
(Continued)

(58) Field of Classification Search
CPC ............. G10L 21/0264; G10L 21/0232; G10L 21/0208; G10L 2021/02082; G10L 25/48; H04R 3/04
(Continued)

(56) References Cited

U.S. PATENT DOCUMENTS

2006/0222172 A1 10/2006 Chhetri et al.
2013/0230184 A1* 9/2013 Kuech .................. H04M 9/085 381/66

(Continued)

FOREIGN PATENT DOCUMENTS

EP 1885154 A1 2/2008
EP 1895433 A1 3/2008
EP 2058804 5/2009

OTHER PUBLICATIONS

Parada Pablo Peso et al: "Non-intrusive estimation of the level of reverberation in speech", 2014 IEEE International Conference on Acoustics, Speech and Signal Processing (ICASSP), IEEE, May 4, 2014 (May 4, 2014), pp. 4718-4722, XP032618244, D0I: 10.1109/ICASSP.2014.6854497 [extrait le Jul. 11, 2014] */* section: "3.1 Feature extraction" */.

(Continued)

*Primary Examiner* — Xu Mei
*Assistant Examiner* — Ubachukwu Odunukwe
(74) *Attorney, Agent, or Firm* — Miller, Matthias & Hull LLP

(57) ABSTRACT

A method for estimating an instantaneous phase of dereverberated acoustic signal, the method comprising the following steps: measurement of an acoustic signal reverberated by propagation in a medium, estimation of a one short-term Fourier transform of the reverberated acoustic signal with a window function, calculation of an instantaneous frequency of dereverberated signal from said short-term Fourier transform and from an influencing factor of the medium, said influencing factor being a function of a reverberation time of said medium, determination of an instantaneous phase of dereverberated signal by integrating the instantaneous frequency of dereverberated signal over time.

5 Claims, 2 Drawing Sheets

(51) Int. Cl.
*G10L 21/0232* (2013.01)
*H04R 3/04* (2006.01)
*G10L 21/0208* (2013.01)
*G10L 25/48* (2013.01)
*H04R 3/00* (2006.01)

(52) U.S. Cl.
CPC .... *G10L 25/48* (2013.01); *G10L 2021/02082* (2013.01); *H04R 3/00* (2013.01)

(58) Field of Classification Search
USPC .................................................... 381/66, 307
See application file for complete search history.

(56) References Cited

U.S. PATENT DOCUMENTS

| | | | | |
|---|---|---|---|---|
| 2013/0282373 | A1* | 10/2013 | Visser | G10L 21/0208 704/233 |
| 2014/0169575 | A1 | 6/2014 | Gao et al. | |
| 2016/0035367 | A1 | 2/2016 | Goesnar et al. | |
| 2016/0210987 | A1* | 7/2016 | Sugiyama | G10L 21/0232 |

OTHER PUBLICATIONS

Gerkmann Timo et al: "Phase Processing for Single-Channel Speech Enhancement: History and recent advances", IEEE Signal Processing Magazine, IEEE Service Center, Piscataway, NJ, US, vol. 32, No. 2, Mar. 1, 2015 (Mar. 1, 2015), pp. 55-66, XP011573073, ISSN: 1053-5888, D0I: 10.1109/MSP.2014. 2369251 [extrait le Feb. 10, 2015] */*section: "Relation between Phase-and Magnitude Estimation" */*.

French Search Report related to Application No. 16 54713; dated Jan. 19, 2017.

Michaël Betser et al. "Estimation of Frequency for AM/FM Models Using the Phase Vocoder Framework", IEEE Transactions on Signal Processing, vol. 56, No. 2, Feb. 2, 2008 (Feb. 2, 2008) 1053-587X/ $25.00 © 2008 IEEE.

Paul Magron et al. "Phase Recovery in NMF for Audio Source Separation: An Insightful Bechmark".

Antoine Deleforge "Phase-Optimized K-SVD for Signal Extraction From Underdetermined Multichannel Sparse Mixtures", arXiv:1410.2430v1 [cs.SD] Oct. 9, 2014.

X. Xiao et al. "Speech dereverberation for enhancement and recognition using dynamic features constrained deep neural networks and feature adaptation", EURASIP Journal on Advances in Signal Processing (2016) 2016:4 DOI: 10.1186/s13634-015-0300-4.

Belhomme et al. "Anechoic Phase Estimation From Reverberant Signals".

Liu Yang et al: "Restoration of instantaneous amplitude and phase of speech signal in noisy reverberant environments", 2015 23rd European Signal Processing Conference (EUSIPCO), EURASIP, Aug. 31, 2015 (Aug. 31, 2015), pp. 879-883, XP032836465, DOI:10.1109/EUSIPCO.2015/736209 [extrait le Dec. 22, 2015] */* section: 3 Proposed Scheme */; figure 1.

Mowlaee Pejman et al: "Time-frequency constraints for phase estimation in single-channel speech enhancement", 2014 14th International Workshop on Acoustic Signal Enhancement (IWAENC), IEEE Sep. 8, 2014 (Sep. 8, 2014), pp. 337-341, XP032683840, D0I: 10.1109/IWAENC.2014.6354314 [extrait le Nov. 12, 2014] */* section :"3 Proposed Phase Estimation Methods" */; figure 1*.

Timo Gerkmann et al: "Phase estimation in speech enhancement unimportant, important, or impossible?", Electrical & Electronics Engineers in Israel (IEEEI), 2012 IEEE 27th Convention of, IEEE, Nov. 14, 2012 (Nov. 14, 2012), pp. 1-5, XP032277696, DOI: 10.1109/EEEI.20126376931 ISBN: 978-1-4673-4682-5 */* section: IV. Blind Estimation of the Clean Speech Phase */*.

Timo Gerkmann et al: "Phase Processing for Single-Channel Speech Enhancement: History and recent advances", IEEE Signal Processing Magazine, IEEE Service Center, Piscataway, NJ, US, vol. 32, No. 2, Mar. 1, 2015 (Mar. 1, 2015), pp. 55-66, XP011573073, ISSN: 1053-5888, DOI: 10.1109/MSP.2014. 2369251 [extrait le Feb. 10, 2015] */*section: "Relation between Phase- and Magnitude Estimation" */*.

Belhomme et al. "Anechoic Phase Estimation From Reverberant Signals", 2016 IEEE International Workshop on Acoustic Signal Enhancement (IWAENC), IEEE, Sep. 13, 2016. (Sep. 13, 2016), pp. 1-5, XP032983096, DOI: 10.1109/IWAENC.2016.7602896 [extrait le Oct. 19, 2016] * last paragraph of section: 2.2 Estimator with the Hilbert transform: * * Section: "Estimator with the STFT" *.

French Search Report related to Application No. 17 51073; dated May 4, 2017.

* cited by examiner

FIG. 1
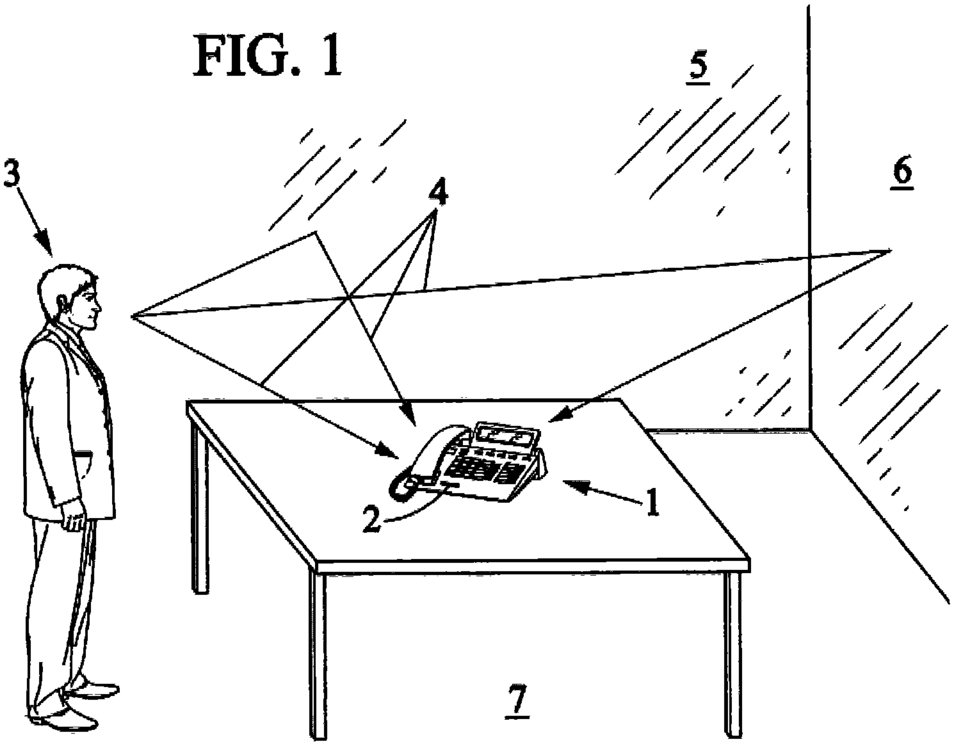
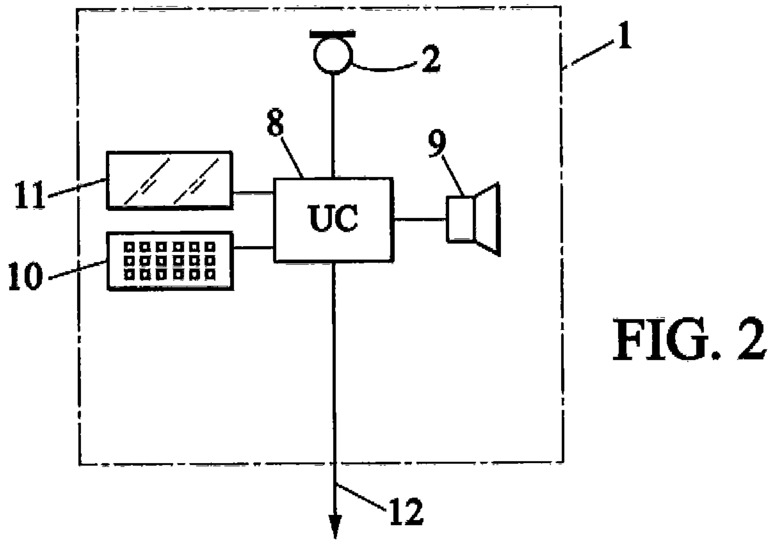
FIG. 2

METHOD AND DEVICE FOR ESTIMATING A DEREVERBERATED SIGNAL

CROSS-REFERENCE TO RELATED APPLICATION

This application claims priority under the Paris Convention to French Patent Application No. 17 51073 filed on Feb. 9, 2017, which claims priority to French Patent Application No. 16 54713 filed on May 25, 2016.

FIELD OF THE DISCLOSURE

The present invention relates to methods and devices for estimating a dereverberated signal.

BACKGROUND OF THE DISCLOSURE

When an original acoustic signal is emitted in a reverberant medium then picked up by a microphone, the microphone picks up a reverberated signal that is dependent on the reverberant medium.

In the following, the term “anechoic acoustic signal” is understood to mean the original acoustic signal that is not reverberated by a medium. An anechoic acoustic signal can sometimes be directly recorded by a microphone, for example when the original acoustic signal is emitted in an anechoic chamber.

However, under common recording conditions, a microphone records a reverberated acoustic signal which is a signal consisting of the original acoustic signal received directly, but also reflections of the original acoustic signal on the reverberant elements of the medium, for example the walls of a room.

Strong acoustic reverberation of the medium can be particularly bothersome since it degrades the quality of the recorded sound and reduces speech intelligibility and speech recognition by machines.

To solve this problem, methods and devices are known for reconstructing the amplitude of a dereverberated signal from an acoustic signal reverberated by a medium.

In the present application, “dereverberated signal” means an estimate of the original acoustic signal, or anechoic signal, obtained by analog or digital processing of a reverberated acoustic signal recorded by a microphone.

By way of example, patent US201603667 describes a dereverberation method which reconstructs a dereverberated signal from an acoustic signal reverberated by a medium, by calculating the amplitude of the dereverberated signal in several frequency bands.

There is a need to further improve the performance of such methods by more accurately estimating the characteristics of the dereverberated signal from a reverberated acoustic signal recorded by a microphone.

Another method is described in the paper “Restoration of instantaneous amplitude and phase of speech signal in noisy reverberant environments” by Yang Liu et al., published in the reports of the 23rd European Signal Processing Conference. This paper describes a supervised method for teaching a Kalman filter to reconstruct the phase and amplitude of a dereverberated signal using a training database consisting of a pair of reverberant and anechoic signals. Such a database, however, is complicated to collect and the results obtained are highly dependent on the quality of the training database and on the fit between the types of reverberations present in the signals of the training database and the reverberations appearing in the actual applications. In addition, the Kalman filter dereverberation method described in that document only allows for linear amplitude and phase modulations, meaning those in which the temporal derivatives of the amplitude and of the phase, dereverberated, are constant over time.

The present invention improves this situation.

SUMMARY OF THE DISCLOSURE

To this end, a first object of the invention is a method for estimating an instantaneous phase of dereverberated acoustic signal. The method comprises the following steps:

(a) measurement of an acoustic signal reverberated by propagation in a medium, (b) estimation of at least one short-term Fourier transform of the reverberated acoustic signal with at least one window function, (c) calculation of at least one instantaneous frequency of dereverberated signal from said short-term Fourier transform and from an influencing factor of the medium, said influencing factor being a function of a reverberation time of said medium, and (d) determination of at least one instantaneous phase of dereverberated signal by integrating the instantaneous frequency of dereverberated signal over time.

In preferred embodiments of the invention, one or more of the following arrangements may possibly be used:

For calculating at least one instantaneous frequency of dereverberated signal from said short-term Fourier transform:

for each frequency band k among a plurality of N frequency bands, a smoothed instantaneous frequency of the reverberated signal in said frequency band k and a rate of change over time of said smoothed instantaneous frequency of the reverberated signal are estimated, an instantaneous frequency of dereverberated signal in said frequency band k is calculated from said smoothed instantaneous frequency of the reverberated acoustic signal, the rate of change over time of said smoothed instantaneous frequency of the reverberated signal, and the influencing factor of the medium, and an instantaneous phase of dereverberated signal is determined in said frequency band k by integrating the instantaneous frequency of dereverberated signal in frequency band k over time;

The influencing factor of the medium is given by:

$$R(t) = \frac{1}{2\delta} + \frac{\min(t, T_h)}{1 - e^{2\delta min(t,T_h)}}$$

where δ and $T_h$ are respectively a damping factor and a duration of an exponential decay $p(t)=e^{-\delta t}1_{[0,T_h]}$ of the impulse response of the medium, and the damping factor δ is calculated from a reverberation time measured in the medium, in particular an $RT_{60}$ reverberation time, for example such that $\delta=3\cdot\log(10)/RT_{60}$;

For estimating a smoothed instantaneous frequency of the reverberated signal for each frequency band k among the plurality of N frequency bands, a reassigned vocoder algorithm is applied;

For calculating said at least one instantaneous frequency of dereverberated signal, a correction factor is determined by multiplying the rate of change over time of the smoothed instantaneous frequency of the reverberated signal by the influencing factor of the medium, in particular said correction factor is added to said smoothed instantaneous frequency of the reverberated acoustic signal;

For calculating at least one instantaneous frequency of dereverberated signal from said short-term Fourier transform:

a plurality of quadratic terms of said at least one short-term Fourier transform is calculated for each frequency band k among a plurality of N frequency bands and for each time period m among a plurality of time periods, and for each frequency band k and each moment of time m, an instantaneous frequency of the dereverberated signal and a rate of change over time of said instantaneous frequency of the dereverberated signal are determined, by calculating a first derivative and a second derivative of a dual parameter solution of a linear system whose coefficients are based on said plurality of quadratic terms and the influencing factor of the medium, said instantaneous frequency of the dereverberated signal being an imaginary part of the first derivative of the dual parameter and said rate of change over time being an imaginary part of the second derivative of the dual parameter, in particular a matrix constructed from said plurality of quadratic terms and from the influencing factor of the medium is inverted in order to solve said linear system;

At least five short-term Fourier transforms of the reverberated acoustic signal are respectively estimated with a first window function, a second window function which is a first derivative of the first window function, a third window function which is a second derivative of the first window function, a fourth window function which is a product of the first window function and a function linearly increasing over time, and a fifth window function which is a first derivative of the fourth window function, and said plurality of quadratic terms are calculated from said at least five short-term Fourier transforms;

For each frequency band k and each moment of time m, an instantaneous amplitude of the dereverberated signal is determined from said plurality of quadratic terms, as are first and second derivatives of the dual parameter for each frequency band k and each moment of time m;

For determining at least one instantaneous phase of dereverberated signal for a frequency band k, a preceding frequency band k' is determined so as to minimize a difference between the central frequencies $f_i$ of the window functions $g_i(t)$ and an estimated frequency in frequency band k, and an instantaneous frequency of dereverberated signal and a rate of change of said instantaneous frequency of dereverberated signal are integrated for said preceding frequency band k'.

The invention also relates to a device for estimating an instantaneous phase of dereverberated acoustic signal, comprising:

measurement means for capturing at least one acoustic signal reverberated by propagation in a medium, means for estimating at least one short-term Fourier transform of the reverberated acoustic signal with at least one window function, means for calculating at least one instantaneous frequency of dereverberated signal from said short-term Fourier transforms and from an influencing factor of the medium, said influencing factor being a function of a reverberation time of said medium, means for determining at least one instantaneous phase of dereverberated signal by integrating the instantaneous frequency of dereverberated signal over time.

BRIEF DESCRIPTION OF THE DRAWINGS

Other features and advantages of the invention will become apparent from the following description of one of its embodiments, given by way of non-limiting example, with reference to the accompanying drawings.

In the drawings:

FIG. 1 is a schematic view illustrating the reverberation of sound in a room when a subject is speaking such that his speech is picked up by a device according to an embodiment of the invention, FIG. 2 is a schematic diagram of the device of FIG. 1.

DETAILED DESCRIPTION OF THE DISCLOSURE

Figure 3:
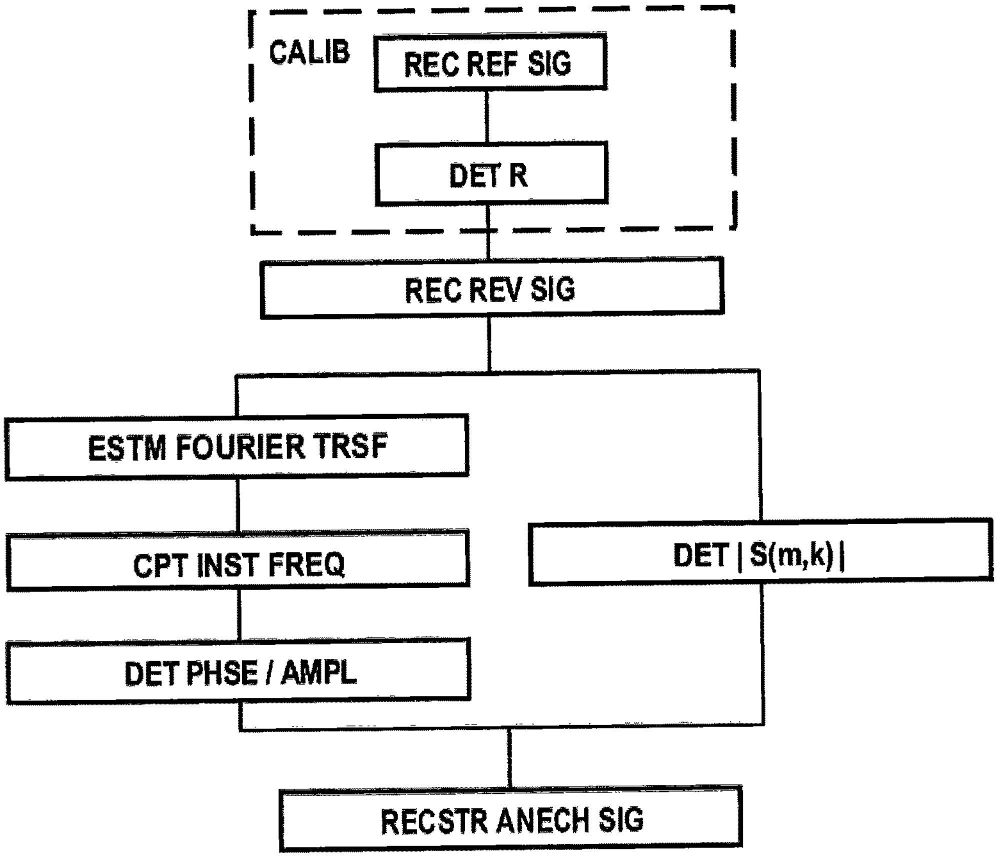
FIG. 3 is a flowchart of a method for reconstructing a dereverberated signal according to an embodiment of the invention, in particular making use of a method for estimating an instantaneous phase of dereverberated signal according to one embodiment of the invention.

In the various figures, the same references designate identical or similar elements.

The aim of the invention is to estimate an instantaneous phase of dereverberated acoustic signal from a measurement of an acoustic signal reverberated by propagation in a medium 7, for example a room of a building as shown schematically in FIG. 1.

The invention thus makes it possible to process the acoustic signals picked up by an electronic device 1 which has a microphone 2. The electronic device 1 may for example be a telephone in the example shown, or a computer or some other device.

When a sound is emitted in the medium 7, for example by person this sound propagates to the microphone 2 along various paths 1, ether directly or after reflection on one or more walls 5, 6 of the medium 7.

As shown in FIG. 2, the electronic device 1 may comprise for example a central processing unit 8 such as a processor or other, connected to the microphone 2 and to various other elements, including for example a speaker 9, a keyboard 10, and a screen 11. The central processing unit 8 can communicate with an external network 12, for example a telephone network.

The invention enables the electronic device 1 to estimate an instantaneous phase of dereverberated acoustic signal.

In a first application which is of primary interest, the instantaneous phase of dereverberated signal can be used to reconstruct a dereverberated signal from a reverberated acoustic signal.

For this purpose, an acoustic signal that is reverberated by propagation in the medium first measured.

Then, a dereverberated signal amplitude spectrum is determined for a plurality of N frequency bands, from the reverberated acoustic signal.

Numerous methods for determining a dereverberated signal amplitude spectrum from a reverberated acoustic signal are known from the prior art.

These methods consist, for example, of estimating a reverberation spectrum from the reverberated acoustic signal and then subtracting said reverberation spectrum from the reverberated acoustic signal.

Methods are therefore known for determining a dereverberated signal amplitude spectrum using:

long-term prediction as described in the paper "Suppression of late reverberation effect on speech signal using long-term multiple-step linear prediction" by K. Kinoshita, M. Delcroix, T. Nakatani, and M. Miyoshi, published in IEEE Transactions on Audio, Speech, and Language Processing, vol. 17, no. 4, p. 534-545, May 2009, stochastic modeling of the impulse response of the medium as described in "A new method based on spectral subtraction for speech dereverberation" by K. Lebart and J. M. Boucher, published in ACUSTICA, vol. 87, no. 3, pp. 359-366, 2001, or deep neural networks as described in "Speech dereverberation for enhancement and recognition using dynamic features constrained deep neural networks and feature adaptation" by X. Xiao, S. Zhao, D. H. Ha Nguyen, X. Zhong, D. L. Jones, E. S. Chang, and H. Li, published in EURASIP Journal on Advances in Signal Processing, vol. 2016, no. 1, p. 1-18, 2016.

In these prior art methods, a dereverberated signal is then reconstructed from the obtained dereverberated signal amplitude spectrum and the phase of the reverberated signal.

There is, however, a need to further improve the quality and intelligibility of the dereverberated signal obtained by this method.

For this purpose, according to the invention, an instantaneous phase of dereverberated signal for each frequency band k among the plurality of N frequency bands is determined from the reverberated acoustic signal by means of a method as described hereinafter.

Then, a dereverberated signal is reconstructed from the dereverberated signal amplitude spectrum and from the estimated phase using the method according to the invention.

In this manner, a reconstructed dereverberated signal that is clearly of higher quality is obtained.

The instantaneous phase of dereverberated signal determined by the method according to the invention can also have uses other than reconstruction of the dereverberated signal, and can be used for example to improve the quality and precision of a sound source location algorithm as known in the literature.

It is known that the reverberant medium can be modeled by a stochastic model by defining an impulse response h(t) of the form:

$$h(t)=b(t)p(t) \tag{1}$$

where $b(t)\sim\mathcal{N}(0,\sigma^2)$ is white noise with a centered Gaussian distribution of variance $\sigma^2$, and $p(t)=e^{-\delta t}1_{[0,T_h]}$ is an exponential decay of the impulse response of the medium where $\delta$ and $T_h$ are respectively a damping factor and a duration of the impulse response of the medium.

Such a stochastic model is described, for example, thesis of J. D. Polack, "Transmission of sound energy in concert halls", which was supported by the Université du Maine in 1988.

The damping factor $\delta$ and the duration of the impulse response $T_h$ can be determined from a reverberation time measured in the medium.

A commonly used reverberation time is the 60 dB reverberation time, denoted $RT_{60}$. The 60 dB reverberation time is the time required for the energy decay curve (EDC) to decrease by 60 dB.

For example, the 60 dB reverberation time can be defined by the inverse integration method of Manfred R. Schroeder (New Method of Measuring Reverberation Time, The Journal of the Acoustical Society of America, 37(3): 409, 1965) by the energy decay curve $EDC(n)=\Sigma_{k=n}^{N_h}h(k)^2$ where h is the impulse response of a medium of length $N_h$ and n is a time index, for example a number of samples obtained by sampling at constant time intervals, n being between 1 and $N_h$. $RT_{60}$ is then the time at time index n required for EDC(n) to decrease by 60 dB.

Typical values of the $RT_{60}$ reverberation time are, for example, values between 0.4 s and 2 s.

Although the $RT_{60}$ reverberation time is most commonly used, it is also possible to use another reverberation time characteristic of the medium 7.

It is then possible to calculate the damping factor of the medium $\delta$ from the $RT_{60}$ reverberation time by the formula $\delta=3\cdot\log(10)/RT_{60}$.

The duration of the impulse response $T_h$ can also be defined from the reverberation time, for example as $T_h=\alpha\cdot RT_{60}$ where $\alpha$ can be greater than 1, for example equal to 1.3.

However, the damping factor of the medium $\delta$ and the duration of the impulse response $T_h$ can also be calculated by other methods known from the prior art.

From the statistical model given by equation (1), the reverberated acoustic signal can be linked to the anechoic acoustic signal by the convolution equation:

$$y(t)=(h*s)(t) \tag{2}$$

where y(t) is the reverberated acoustic signal and s(t) is the anechoic acoustic signal.

The instantaneous phase of the reverberated signal can also be expressed as a function of the Hilbert transform of the reverberated signal, as:

$$\varphi_{rev}(t)=\arctan\left(\frac{\hat{y}(t)}{y(t)}\right) \tag{3}$$

where $\varphi_{rev}(t)$ is the instantaneous phase of the reverberated signal and $\hat{y}(t)$ is the Hilbert transform of the reverberated signal.

It is also possible to link the instantaneous frequency of the reverberated signal to the instantaneous phase of the reverberated signal by the expression:

$$f_{rev}(t)=\frac{1}{2\pi}\frac{d\varphi_{rev}(t)}{dt}(t) \tag{4}$$

In a first embodiment of the invention, one can first estimate the rate of change oven time of the smoothed instantaneous frequency of the reverberated signal. One can then determine the instantaneous frequency of the anechoic signal as a function of the expected value of the instantaneous frequency of the reverberated signal based on equations (1) to (4), as:

$$f(t)=E[f_{rev}(t)]+\dot{f}\left(\frac{1}{2\delta}+\frac{\min(t,T_h)}{1-e^{2\delta\min(t,T_h)}}\right) \tag{5}$$

where f(t) is the instantaneous frequency of the anechoic signal estimated at time t, $E[f_{rev}(t)]$ is the expected value of the instantaneous frequency of the reverberated signal at time t, and $\dot{f}$ is the rate of change over time of the instantaneous frequency of the reverberated signal.

The expected value of the instantaneous frequency of the reverberated signal at time t cannot be measured but can be approximated by temporal smoothing of the instantaneous frequency of the measured reverberated signal.

It is thus possible to estimate an instantaneous frequency of a dereverberated signal as a function of an instantaneous frequency of the reverberated signal based on equations (1) to (5), as:

$$\tilde{f}(t) = \overline{f_{rev}(t)} + \dot{f}\left(\frac{1}{2\delta} + \frac{\min(t, T_h)}{1 - e^{2\delta \min(t,T_h)}}\right) \tag{6}$$

where $\tilde{f}(t)$ is the instantaneous frequency of the estimated dereverberated signal at time t, $\overline{f_{rev}(t)}$ is a smoothed instantaneous frequency of the reverberated signal at time t now the SIFT is smoothed directly, and $\dot{f}$ is the rate of change over time of the smoothed instantaneous frequency of the reverberated signal. Equation (6) makes it possible to estimate an instantaneous frequency of the dereverberated signal as a function of the smoothed instantaneous frequency of the reverberated signal, the rate of change over time of the instantaneous frequency, and an influencing factor of the medium R is given by $$R(t) = \frac{1}{2\delta} + \frac{\min(t, T_h)}{1 - e^{2\delta \min(t,T_h)}} \tag{7}$$

We can thus rewrite equation (6) as:

$$\tilde{F}(t) = \overline{f_{\mathrm{rev}}(t)} + \dot{f}R(t) \tag{8}$$

An instantaneous phase of the dereverberated signal $\tilde{\varphi}(t)$ can subsequently be determined by temporal integration, as:

$$\tilde{\varphi}(t) = 2\pi\int_0^t \tilde{f}(\tau)d\tau + \tilde{\varphi}(0) \tag{9}$$

where $\tilde{\varphi}(0)$ Is an original phase of the dereverberated signal.

The frequency and phase of the dereverberated signal which are estimated by means of equations (6) to (9) are therefore estimates of the frequency and phase of the original acoustic signal or anechoic signal.

The tests carried out by the inventors indicate that these estimates are particularly good because they lead to a dereverberated signal of a quality clearly superior to the prior art.

Such a method can be further improved by directly determining both the instantaneous frequency of the dereverberated signal and the rate of change of the instantaneous frequency of the dereverberated signal.

This makes it possible to estimate more precisely both the phase and amplitude of the dereverberated signal.

For this purpose, several discrete short-term Fourier transforms of the reverberated signal y(t) are calculated for several associated window functions.

More precisely, a first window function $g_k(t)$ is defined for each frequency band k among a plurality of N frequency bands, $k \in [0,N-1]$, and for any time t, $t \in \mathbb{R}$. The window function $g_k(t)$ is a complex response function of an analog bandpass filter centered on a frequency $f_k$. Then a second, third, fourth, and fifth window function are further defined from the first window function as follows:

The second window function $\dot{g}_k(t)$ is a first derivative of the first window function, The third window function $\ddot{g}_k(t)$ is a first derivative of the first window function, The fourth window function $g'_k(t) = t \cdot g_k(t)$ is a product of the first window function and the time function, and The fifth window function $\dot{g}'_k(t)$ is a first derivative of the fourth window function.

Five short-term Fourier transforms of the reverberated acoustic signal are respectively calculated for each of said five window functions:

$$Y_g[m,k] = (g_k * y)(t_m) \tag{10}$$

$$Y_{\dot{g}}[m,k] = (\dot{g}_k * y)(t_m) \tag{11}$$

$$Y_{\ddot{g}}[m,k] = (g_k * y)(t_m) \tag{12}$$

$$Y_{g'}[m,k] = (g'_k * y)(t_m) \tag{13}$$

$$Y_{\dot{g}'}[m,k] = (\dot{g}'_k * y)(t_m) \tag{14}$$

for each frequency band k among the plurality of frequency bands and each time period m (equivalently $t_m$) among a plurality of time periods, where $$t_m = m\frac{R}{f_s}$$

and R is a sampling factor or number of samples per time period and $f_s$ is a sampling frequency.

From the form of the impulse response given in (1) and the relation between the reverberated acoustic signal and the anechoic acoustic signal given by equation (2), we can deduce relations between the quadratic terms of the discrete short-term Fourier transforms of the anechoic acoustic signal and the reverberated acoustic signal, as:

$$|S_g|^2 = \frac{1}{\sigma^2}E[2\delta|Y_g|^2 + 2\Re(Y_g^* Y_{\dot{g}})]$$

$$S_g^* S_{\dot{g}} = \frac{1}{\sigma^2}E[2\delta Y_g^* Y_{\dot{g}} + Y_g^* Y_{\ddot{g}} + |Y_{\dot{g}}|^2]$$

$$S_g^* S_{g'} = \frac{1}{\sigma^2}E[2\delta Y_g^* Y_{g'} + Y_{\dot{g}}^* Y_{g'} + Y_g^* Y_{\dot{g}'}]$$

$$|S_{g'}|^2 = \frac{1}{\sigma^2}E[2\delta|Y_{g'}|^2 + \Re(Y_{g'}^* Y_{\dot{g}'})]$$

$$S_{g'}^* S_{\dot{g}} = \frac{1}{\sigma^2}E[2\delta Y_{g'}^* Y_{\dot{g}} + Y_{\dot{g}'}^* Y_{\dot{g}} + Y_{g'}^* Y_{\ddot{g}}]$$

where each term is defined for each frequency band k among the plurality of frequency bands and each time period m among a plurality of time periods, but where the dependencies in k and m have been hidden to simplify the notation (for example $|S_g|^2$ in the above equation is actually $|S_g[m,k]|^2$).

Here, too, the expected value of the terms can be approximated by temporal smoothing and we can obtain the estimates:

$$\widehat{|S_g|^2} = \frac{1}{\sigma^2}\left(2\delta\overline{|Y_g|^2} + 2\Re(\overline{Y_g^* Y_{\dot{g}}})\right) \tag{15}$$

$$\widehat{S_g^* S_{\dot{g}}} = \frac{1}{\sigma^2}\left(2\delta\overline{Y_g^* Y_{\dot{g}}} + \overline{Y_g^* Y_{\ddot{g}}} + \overline{|Y_{\dot{g}}|^2}\right) \tag{16}$$

$$\widehat{S_g^* S_{g'}} = \frac{1}{\sigma^2}(2\delta\overline{Y_g^* Y_{g'}} + \overline{Y_{\dot{g}}^* Y_{g'}} + \overline{Y_g^* Y_{\dot{g}'}}) \tag{17}$$

$$\widehat{|S_{g'}|^2} = \frac{1}{\sigma^2}\left(2\delta\overline{|Y_{g'}|^2} + 2\Re(\overline{Y_{g'}^* Y_{\dot{g}'}})\right) \tag{18}$$

$$\widehat{S_{g'}^* S_{\dot{g}}} = \frac{1}{\sigma^2}(2\delta\overline{Y_{g'}^* Y_{\dot{g}}} + \overline{Y_{\dot{g}'}^* Y_{\dot{g}}} + \overline{Y_{g'}^* Y_{\ddot{g}}}) \tag{19}$$

Here, too, we can define an influencing factor of the medium R given by $$R = \frac{1}{2\delta}$$

From these quadratic terms and by performing a second-order Taylor expansion of the anechoic signal s(t), we can then establish a linear system verified by the first and second derivatives of a dual parameter $\widehat{\theta_k}(t)=\widehat{\lambda_k}(t)+i\cdot\widehat{\varphi_k}(t)$ representing the dereverberated signal in exponential notation:

$$s(t)=\Sigma_k \widehat{s_k}(t)=\exp(\widehat{\theta_k}(t))=\exp(\widehat{\lambda_k}(t)\cdot\exp(i\cdot\widehat{\varphi_k}(t))$$

where $\widehat{\lambda_k}(t)=\Re(\widehat{\theta_k}(t))$ and $\widehat{\varphi_k}(t)=\Im(\widehat{\theta_k}(t))$ We then have:

$$\hat{A}_{m,k}\begin{bmatrix}\hat{\dot{\theta}}_{m,k}\\ \hat{\ddot{\theta}}_{m,k}\end{bmatrix}=\hat{b}_{m,k} \tag{20}$$

where $$\hat{A}_{m,k}=\sum_{w_{m,k}}\begin{bmatrix}\widehat{|S_g|^2} & \widehat{S_g^*S_m}\\ \widehat{S_gS_m^*} & \widehat{|S_m|^2}\end{bmatrix} \tag{21}$$

and $$\hat{b}_{m,k}=\sum_{w_{m,k}}\begin{bmatrix}\widehat{S_g^*S_{\dot{g}}}\\ \widehat{S_m^*S_{\dot{g}}}\end{bmatrix} \tag{22}$$

where $S_m[m',k']=(t_{m'}-t_m)S_g[m',k']-S_{g'}[m',k']$, the terms $w_{m,k}[m',k']$ are spatio-temporal masks indicating whether a sinusoid q dominant at time period m and in frequency band k is also dominant at time period m' and in frequency band k', and where the sums are defined on the dependencies of the quadratic terms and spatio-temporal masks as a function of the time periods m' and frequency bands k' of the quadratic terms and spatio-temporal masks (here again the dependencies in m' and k' have been hidden to simplify the notation).

It is then possible to determine the first derivative of the dual parameter $\hat{\dot{\theta}}_{m,k}$ and the second derivative of the dual parameter $\hat{\ddot{\theta}}_{m,k}$ by inverting matrix A to obtain.

$$\begin{bmatrix}\hat{\dot{\theta}}_{m,k}\\ \hat{\ddot{\theta}}_{m,k}\end{bmatrix}=\hat{A}_{m,k}^{-1}\hat{b}_{m,k} \tag{23}$$

it is also possible to deduce, from a second-order Taylor expansion of the anechoic signal (t), an estimate of the instantaneous amplitude of the dereverberated acoustic signal $\hat{\alpha}_{m,k}=\exp(\widehat{\lambda_k}(t))$, as:

$$\widehat{\alpha^2}_{m,k}=\frac{\sum_{w_{m,k}}\widehat{|S_g|^2}}{\sum_{w_{m,k}}\widehat{|G_{m,k}|^2}} \tag{24}$$

where the term $G_{m,k}[m',k']$ is determined from the first derivative of the dual parameter $\hat{\dot{\theta}}_{m,k}$ and from the second derivative of the dual parameter $\hat{\ddot{\theta}}_{m,k}$, as:

$$G_{m,k}[m',k']=\exp\left(\dot{\theta}_{m,k}(t_m'-t_m)+1/2\ddot{\theta}_{m,k}(t_m'-t_m)^2\right)\sum_n g_{k'}[n]\times \exp\left(-n/f_s\left(\dot{\theta}_{m,k}+\ddot{\theta}_{m,k}(t_m'-t_m-n/2f_s)\right)\right)$$

A method for estimating an instantaneous phase of a dereverberated acoustic signal according to the invention thus comprises the following steps:

(a) a measurement step, during which the reverberated acoustic signal measured by propagation in a medium, (b) an estimation step, during which at least one smoothed short-term Fourier transform of the reverberated acoustic signal is estimated with at least one window function, (c) a calculation step, during which at least one instantaneous frequency of dereverberated signal is calculated from said smoothed short-time Fourier transform and from an influencing factor of the medium, said influencing factor being a function of a reverberation time of said medium, (d) a determination step, during which at least one instantaneous phase of dereverberated signal is determined integrating the instantaneous frequency of the dereverberated signal over time.

(a) Measurement Step:

During this step, the microphone 2 picks an acoustic signal reverberated by propagation in the medium 7, for example when the person 3 is talking. This signal is sampled and stored in the processor 8 or in auxiliary memory (not shown).

As indicated above, the captured signal y(t) a convolution of the emitted anechoic signal s(t) (speech) with the impulse response h(t) of the medium between the person speaking 3 and the microphone 2.

(b) Estimation Step:

During this step, at least one short-term Fourier transform of the reverberated acoustic signal is estimated with at least one window function.

In particular, at least one discrete local Fourier transform of the reverberated acoustic signal is calculated using window functions w(n) where n is between 0 and N−1.

Such a discrete local Fourier transform of the reverberated acoustic signal can be implemented with window functions w(n) of size N and time frames separated by jumps of R signal samples.

The reverberated acoustic signal being sampled with frequency $f_s$, for example 16 kHz, we thus obtain N discrete frequencies $$f_k = k\frac{f_s}{N},\ k \in [0, N-1]$$

and $N_f$ time frames. N is equal for example to 256, 512, or 1024. R is equal for example to half or a fourth of N.

In the second embodiment of the invention, at least five short-term Fourier transforms of the reverberated acoustic signal can be estimated, for example as given by equations (10) to (14) above with respectively a first, second, third, fourth, and fifth window function $g_k(t)$, $\dot{g}_k(t)$, $\ddot{g}_k(t)$, $g'_k(t)$ and $\dot{g}'_k(t)$ as defined above.

(c) Calculation Step:

Next a calculation step can be implemented during which at least one instantaneous frequency of dereverberated signal is calculated from said short-term Fourier transform and from an influencing factor of the medium, said influencing factor being a function of a reverberation time of said medium.

Estimation of the instantaneous frequency or frequencies of the reverberated signal may typically be done on a number $N_f$ of frames, for example one hundred frames, corresponding to at least a few seconds of signal depending on the analysis parameters selected. The frames may have an individual duration of 10 to 100 ms, in particular about 32 ms. The frames may overlap each other, for example with an overlap of about 50% between successive frames.

In the first embodiment of the invention described above in equations (5) to (9), one can first determine a smoothed instantaneous frequency of the reverberated signal and a rate of change over time of said smoothed instantaneous frequency of the reverberated signal, from the short-term Fourier transform of the reverberated acoustic signal estimated in step (b).

To do so, one may begin by determining the smoothed instantaneous frequency of the reverberated signal by first measuring the instantaneous frequency of the reverberated signal and then smoothing said instantaneous frequency, for example by temporal smoothing using a Savitzky-Golay filter.

The instantaneous frequency of the reverberated signal can be determined in general by a Fourier transform of the signal.

In a variant embodiment, for each frequency band k among a plurality of N frequency bands, an instantaneous frequency of the reverberated signal in said frequency band k can be estimated as well as a rate of change over time of said instantaneous frequency of the reverberated signal.

For this purpose, it is possible for example to apply a reassigned vocoder algorithm using a discrete local Fourier transform of the reverberated acoustic signal (or short-term Fourier transform) or vice versa.

Such a reassigned vocoder algorithm is described for example in the paper "Estimation of frequency for AM/FM models using the phase vocoder framework" by M. Betser, P. Collen, G. Richard, and B. David, published in IEEE Transactions On Signal Processing, vol. 56, no. 2, p. 505-517, February 2008.

Once the instantaneous frequencies of the reverberated signal are estimated, they can then be smoothed by a temporal smoothing algorithm as indicated above in order to obtain the smoothed instantaneous frequencies of the reverberated signal.

In this step, the above equation (8) $\tilde{f}(t)=\overline{f_{rev}(t)}+\dot{f}R(t)$ is calculated in order to estimate an instantaneous frequency of the dereverberated signal.

In the variant embodiment in which a smoothed instantaneous frequency of the reverberated signal is estimated for each frequency band k among a plurality of N frequency bands, it is then possible to calculate more precisely an instantaneous frequency of dereverberated signal $\tilde{F}(m,k)$ in each frequency band k and for each time frame m.

More precisely, the instantaneous frequency of dereverberated signal $\tilde{F}(m,k)$ is calculated from the smoothed instantaneous frequency of the reverberated acoustic signal of said frequency band k, the rate of change over time of said smoothed instantaneous frequency of the reverberated signal, and the influencing factor of the medium R(t).

This calculation also uses equation (8) which is applied independently to each frequency band k, in other words replacing $\tilde{f}(t)$) with $\tilde{F}(k)$.

To estimate the instantaneous frequency of the dereverberated signal $\tilde{f}(t)$ or $\tilde{F}(m,k)$, a correction factor $\dot{f}R(t)$ is first determined by multiplying the rate of change over time $\dot{f}$ of the smoothed instantaneous frequency of the reverberated signal by the influencing factor of the medium $R(t)=1/(2\delta)+\min(t,T_h)/(1-\exp(2\delta\min(t,T_h)))$.

Then, the correction factor $\dot{f}R(t)$ is added to the smoothed instantaneous frequency of the reverberated acoustic signal according to equation (8).

In the second embodiment of the invention, which is the subject of equations (10) to (24) above, it is possible to directly determine both the instantaneous frequency of the dereverberated signal and the rate of change of the instantaneous frequency of the dereverberated signal.

To do this, we seek to solve the system given by equation (20), in particular by inverting matrix $\hat{A}_{m,k}$ as indicated in equation (23).

Having estimated the five short-term Fourier transformations of equations (10) to (14) $Y_g$, $Y_{\dot{g}}$, $Y_{\ddot{g}}$, $Y_{\dot{g}}$, and $Y_{g'}$, we can begin by temporally smoothing said Fourier transforms by any temporal smoothing algorithm, in particular the filters detailed above.

Then, the plurality of quadratic terms of equations (15) to (19) are calculated: $\widehat{|S_g|^2}$, $\widehat{S_g^* S_{\dot{g}}}$, $\widehat{S_g^* S_{g'}}$, $\widehat{|S_{g'}|^2}$ and $\widehat{S_{g'}^* S_{\dot{g}}}$ according to the influencing factor of the medium $R=\frac{1}{2}\delta$ and terms $Y_g$, $Y_{\dot{g}}$, $Y_{\ddot{g}}$, $Y_{\dot{g}}$, and $Y_{g'}$ of the short-term Fourier transforms for each frequency band k and each time period m among a plurality of time periods.

From these quadratic terms, it is then possible to construct matrix $\hat{A}_{m,k}$ given in equation (21), as well as vector $\hat{b}_{m,k}$ of equation (22).

Finally, it is possible to determine, for each frequency band k and each moment of time m, an instantaneous frequency of dereverberated acoustic signal $\widehat{\varphi_k}(t)=\Im(\hat{\dot{\theta}}_{m,k})$ and a rate of change of said instantaneous frequency of dereverberated acoustic signal $\widehat{\varphi_k}(t)=\Im(\hat{\ddot{\theta}}_{m,k})$, by solving the linear system of equation (20).

For this, one can invert matrix $\hat{A}_{m,k}$ as indicated in equation (23).

Furthermore, it is possible to determine, from the first derivative of the dual parameter $\hat{\dot{\theta}}_{m,k}$ and from the second derivative of the dual parameter $\hat{\ddot{\theta}}_{m,k}$, an instantaneous amplitude of the dereverberated signal for each frequency band k and each moment of time m.

For this purpose, the equation (24) detailed above is applied.

In the two embodiments described, the influencing factor of the medium R can be previously determined in a preliminary calibration step.

During this preliminary calibration step, a reference acoustic signal is measured that is reverberated by propagation in the medium, and the influencing factor of the medium is determined from said reference acoustic signal.

For this purpose it is possible, for example, to determine a reverberation time of said medium by methods otherwise known, for example the $RT_{60}$ reverberation time as described above, and to deduce therefrom the damping factor δ and the duration of the impulse response $T_h$.

The reference acoustic signal may be an acoustic signal reverberated by the medium from an original signal known to the device.

However, determination of the influencing factor of the medium may also be carried out "blind", meaning from a reverberated signal recorded following an arbitrary original signal.

Advantageously, it is possible to use a plurality of reference acoustic signals which correspond to a respective plurality of different cases (different people speaking, different positions, different media 7). The number of reference acoustic signals may be several hundred, or even several thousand.

In one particular embodiment of the invention, the reference acoustic signal may consist of the reverberated acoustic signal used by the method according to the invention, so that determination of the influencing factor of the medium is then carried out directly during implementation of the method for estimating the instantaneous phase and without requiring a preliminary calibration step.

The determination of the influencing factor of the medium may also be carried out in a repetitive manner, so that the device 1 adapts for example to changing the person speaking 3, to movements of the person speaking 3, to movements of the device 1 or of other objects in the environment 7.

(d) Determination Step:

During this last step, the instantaneous phase of the dereverberated signal $\tilde{\varphi}(t)$ is determined by temporal integration of the dereverberated instantaneous frequency as indicated in equation (9).

This temporal integration may be performed using an original phase of the dereverberated signal $\tilde{\varphi}(0)$.

In most cases, the dereverberated signal can be assumed to have a phase equal to the phase of the original reverberated signal, so that, for example we have $\tilde{\varphi}(0)=\varphi_{rev}(0)$. This applies in particular to the case where the recorded signal is preceded by silence, so that the reverberation is initially zero.

Alternatively, here again an instantaneous phase of dereverberated signal $\tilde{\phi}(m,k)$ can be determined in each frequency band k among the plurality of N frequency bands and for each time frame m, by integrating the instantaneous frequency of dereverberated signal of said frequency band k over time, in other words by summing it over the time frames m.

When, in order to estimate a smoothed instantaneous frequency of the reverberated signal for each frequency band k among the plurality of N frequency bands, a discrete local Fourier transform of the reverberated acoustic signal is calculated using window functions w(n) with n between 0 and N−1, it is necessary to take into account said window functions w(n) for the calculation of the instantaneous phase of the anechoic signal φ(t).

We thus have:

$$\Phi(m,k)=\varphi\left(\frac{mR}{f_s}\right)+\arg\left(r\left(k,\,f\left(\frac{mR}{f_s}\right)\right)\right)$$

where $$\varphi\left(\frac{mR}{f_s}\right)$$

is the Hilbert phase as defined by equation (3) for the time frame of index m, Φ(m,k) is the phase of the anechoic signal, and Γ(k,f) is a correction factor linked to the window functions w(n) which can for example be written:

$$\Gamma(k,f)=\sum_{n=0}^{N-1}w(n)\exp\left(i\left[\frac{2\pi(f-f_k)n}{f_s}+\pi\dot{f}\left(\frac{n}{f_s}\right)^2\right]\right)$$

The temporal integration of the instantaneous frequencies determined for the dereverberated signal can then be written as a sum over the time frames:

$$\tilde{\Phi}(m,k)=\tilde{\Phi}(m-1,k)+2\pi\tilde{F}(m,k)\frac{R}{f_s}+\arg\left(r\left(k,\,\tilde{f}\left(\frac{mR}{f_s}\right)\right)\Gamma^*\left(k,\,\tilde{f}\left(\frac{(m-1)R}{f_s}\right)\right)\right)$$

where $\tilde{F}$(m,k) is the instantaneous frequency of dereverberated signal for frequency band k and for time frame m and Γ* denotes the conjugate complex of the correction factor Γ linked to the window functions w(n).

In a manner analogous to the above case in which a single smoothed instantaneous frequency is determined, it is possible for example to initialize $\tilde{\Phi}(0,k)$ for each frequency band k with the value $\Phi_{rev}(0,k)$ in other words to consider zero reverberation initially.

In the second embodiment of the invention, the terms of the short-term Fourier transform of the dereverberated signal which can be inverted to reconstruct a dereverberated signal are similarly estimated.

In this latter embodiment, it is advantageously possible to carry out a sequence for integrating the phase in the following manner.

Since the instantaneous frequency varies over time, it may be advantageous to sweep the frequency bands to identify the best preceding frequency band k' for integration between time $t_{m-1}$ and time $t_m$. For this purpose, for each given frequency band k, it is possible to determine a preceding frequency band k' that allows minimizing a difference between the central frequencies $f_i$ of the window functions $g_i(t)$ and an estimated frequency in frequency band k, for example as $$k'=argmin_{i\in[0,N-1]}\left|\frac{1}{2\pi}\left(\hat{\dot{\varphi}}_{m,k}-\hat{\ddot{\varphi}}_{m,k}\frac{R}{f_s}\right)-f_i\right|$$

The phase can then be integrated between time m−1 (in an equivalent manner $t_{m-1}$) and time m (in an equivalent manner $t_m$) from the instantaneous frequency of dereverberated acoustic signal $\widehat{\dot{\varphi}_k}$ (t) and from the rate of change of said instantaneous frequency of dereverberated acoustic signal $\widehat{\ddot{\varphi}_k}$ (t) as follows:

$$\hat{\varphi}_{m,k}=\hat{\varphi}_{m-1,k'}+\hat{\dot{\varphi}}_{m-1,k'}\frac{R}{f_s}+\frac{1}{2}\hat{\ddot{\varphi}}_{m-1,k'}\left(\frac{R}{f_s}\right)^2$$

Tests show that use of the phase and/or estimated amplitude of the dereverberated signal in algorithms for reverberated signal reconstruction and source location, instead of the conventional use of the phase of the reverberated signal, significantly improves the quality and intelligibility of the dereverberated signal, and provides better sound source location.

For example, tests have shown a 10 dB increase in the signal-to-reverberation ratio (SRR) and a 5 dB decrease in the cepstral distance (CD), which respectively correspond to a significant gain in dereverberation and a significant reduction in distortion.

The invention claimed is:

1. A method for improving quality of an acoustic signal captured by a system having a microphone and at least one processing unit receiving signal from the microphone, the method comprising an estimation step including the following substeps:

(a) measurement, by said microphone, of an acoustic signal reverberated by propagation in a medium, b) estimation, by said at least one processing unit, of at least one short-term Fourier transform of the reverberated acoustic signal with at least one window function, (c) calculation, by said at least one processing unit, of at least one instantaneous frequency of dereverberated signal from said short-term Fourier transform and from an influencing factor of the medium, said influencing factor being a function of a reverberation time of said medium, wherein, for calculating said at least one instantaneous frequency of dereverberated signal from said short-term Fourier transform, said at least one processing unit:

calculates a plurality of quadratic terms of said at least one short-term Fourier transform for each frequency band k among a plurality of N frequency bands and for each time period m among a plurality of time periods, and determines, for each frequency band k and each moment of time m, an instantaneous frequency of the dereverberated signal and a rate of change over time of said instantaneous frequency of the dereverberated signal, by calculating a first derivative and a second derivative of a dual parameter solution of a linear system whose coefficients are based on said plurality of quadratic terms and the influencing factor of the medium, said instantaneous frequency of the dereverberated signal being an imaginary part of the first derivative of the dual parameter and said rate of change over time being an imaginary part of the second derivative of the dual parameter, inverts a matrix constructed from said plurality of quadratic terms and from the influencing factor of the medium, in order to solve said linear system, (d) determination, by said at least one processing unit, of at least one instantaneous phase of dereverberated signal by integrating the instantaneous frequency of dereverberated signal over time, said estimation step being followed by at least one dereverberation step wherein acoustic signal captured by said microphone is dereverberated by said at least one processing unit using said instantaneous phase.

2. The method according to claim 1, wherein at least five short-term Fourier transforms of the reverberated acoustic signal are respectively estimated with a first window function, a second window function which is a first derivative of the first window function, a third window function which is a second derivative of the first window function, a fourth window function which is a product of the first window function and a function linearly increasing over time, and a fifth window function which is a first derivative of the fourth window function, and wherein said plurality of quadratic terms are calculated from said at least five short-term Fourier transforms.

3. The method according to claim 1, wherein for each frequency band k and each moment of time m, an instantaneous amplitude of the dereverberated signal is determined from said plurality of quadratic terms, as are first and second derivatives of the dual parameter for each frequency band k and each moment of time m.

4. The method according to claim 1, wherein, for determining at least one instantaneous phase of dereverberated signal for a frequency hand k, a preceding frequency band k' is determined so as to minimize a difference between the central frequencies f_i of the window functions g_i (t) and an estimated frequency in frequency band k, and an instantaneous frequency of dereverberated signal and a rate of change of said instantaneous frequency of dereverberated signal are integrated for said preceding frequency band k'.

5. A device for improving quality of an acoustic signal, comprising:

a microphone for capturing at least one acoustic signal reverberated by propagation in a medium;

at least one processing unit receiving signal from said microphone and adapted for:

estimating at least one short-term Fourier transform of the reverberated acoustic signal with at least one window function;

calculating at least one instantaneous frequency of dereverberated signal from said short-term Fourier transform and from an influencing factor of the medium, said influencing factor being a function of a reverberation time of said medium;

determining at least one instantaneous phase of dereverberated signal by integrating the instantaneous frequency of dereverberated signal over time;

wherein, for calculating said at least one instantaneous frequency of dereverberated signal from said short-term Fourier transform, said at least one processor is adapted for:

calculating a plurality of quadratic terms of said at least one short-term Fourier transform for each frequency band k among a plurality of N frequency bands and for each time period m among a plurality of time periods; and determining, for each frequency band k and each moment of time m, an instantaneous frequency of the dereverberated signal and a rate of change over time of said instantaneous frequency of the dereverberated signal, by calculating a first derivative and a second derivative of a dual parameter solution of a linear system whose coefficients are based on said plurality of quadratic terms and the influencing factor of the medium, said instantaneous frequency of the dereverberated signal being an imaginary part of the first derivative of the dual parameter and said rate of change over time being an imaginary part of the second derivative of the dual parameter;

inverting a matrix constructed from said plurality of quadratic terms and from the influencing factor of the medium, in order to solve said linear system, and wherein said at least one processor is further adapted for dereverberating acoustic signal captured by said microphone, using said instantaneous phase.

* * * * *